United States Patent [19]

Fujimura et al.

[11] 4,187,013

[45] Feb. 5, 1980

[54] PHOSPHOR SCREEN EXPOSURE APPARATUS

[75] Inventors: Takasi Fujimura; Syokichi Endo, both of Mobara, Japan

[73] Assignee: Hitachi, Ltd., Japan

[21] Appl. No.: 872,038

[22] Filed: Jan. 25, 1978

Related U.S. Application Data

[63] Continuation of Ser. No. 710,306, Jul. 30, 1976, abandoned.

[30] Foreign Application Priority Data

Oct. 6, 1975 [JP] Japan ............................ 50-11973375

[51] Int. Cl.[2] ............................................. G03B 41/00

[52] U.S. Cl. ....................................... 354/1; 250/573; 313/24

[58] Field of Search .................... 354/1; 250/226, 354, 250/355, 238, 239, 573, 205, 214 P; 362/218; 313/24, 35

[56] References Cited

U.S. PATENT DOCUMENTS

| | | | |
|---|---|---|---|
| 2,434,924 | 1/1948 | Hamilton | 250/226 X |
| 3,523,495 | 8/1970 | Giedd et al. | 354/76 |
| 3,603,827 | 9/1971 | Degawa et al. | 313/35 X |
| 3,610,125 | 10/1971 | Touchy | 354/4 |
| 3,636,836 | 1/1972 | Maddox et al. | 354/1 |
| 3,783,276 | 1/1974 | Allington | 250/226 |
| 3,832,067 | 8/1974 | Kopf et al. | 250/573 X |
| 3,949,226 | 4/1976 | Dugan et al. | 354/1 X |

*Primary Examiner*—John Gonzales
*Attorney, Agent, or Firm*—Craig and Antonelli

[57] ABSTRACT

An exposure apparatus which is used during the formation of the phosphor screen of a color picture tube includes a light quantity control unit in which the temperature of its light receiver does not increase, nor is the light receiver attacked by ultraviolet rays and which is capable of controlling the quantity of light with a high degree of accuracy. The light receiver is mounted in the vicinity of the light source of the exposure apparatus and it is cooled by water.

5 Claims, 3 Drawing Figures

PHOSPHOR SCREEN EXPOSURE APPARATUS

This is a continuation of application Ser. No. 710,306, filed July 30, 1976, now abandoned.

The present invention relates to an exposure apparatus which is used during the formation of the phosphor screen of a color picture tube.

Generally, to form the phosphor screen of a color picture tube, a phosphor screen exposure apparatus is used and the inside surface of the panel coated with a slurry of phosphor material or the phosphor screen is exposed to the light from a light source through a shadow mask, thus forming tri-color phosphor dots or phosphor stripes corresponding to the mask holes in the shadow mask on the phosphor screen. The size of the thus formed phosphor dots or stripes constitutes an important factor which determines the picture quality such as the color phase irregularity of the color picture tube. For this reason, the phosphor dots or stripes must be formed so that the resulting dots or stripes always have a predetermined size and this size is affected greatly in particular by the amount of light to which the slurry of phosphor material is exposed during the above-mentioned manufacturing process. Thus, exposure apparatus have heretofore been used widely which incorporate a light quantity control unit so that the luminance at the position of its one or plurality of light receiving elements is detected and the detector output signal is maintained at a predetermined value thus maintaining the brightness of the light source at a constant value.

A disadvantage of the conventional light quantity control units of this type is that since the light receiving element is disposed between the light source and the panel, the light receiving element is subjected to the intense heat radiation and ultraviolet rays from the light source with the resulting rise in its temperature, thus causing a variation in the detector output signal or deterioration in the material of the light receiving element and thereby making it difficult to control the brightness of the light source with a high degree of accuracy.

It is an object of this invention to provide an exposure apparatus including an improved light quantity control unit in which the temperature of its light receiver does not rise, nor is the light receiver attacked by ultraviolet rays and which is capable of controlling the light quantity with a high degree of accuracy.

It is another object of this invention to provide an exposure apparatus wherein the light receiver of a light quantity control unit is mounted in the vicinity of the light source of the exposure apparatus, and light receiver cooling water channels are provided in addition to a light source cooling water channel.

It is still another object of this invention to provide an exposure apparatus wherein an optical system for absorbing the heat radiation and ultraviolet rays from a light source is provided in the front part of a light receiving system including a light receiver.

These and other objects, features and advantages of this invention will be apparent from the following detailed description taken in conjunction with the accompanying drawings, in which.

Figure 1:
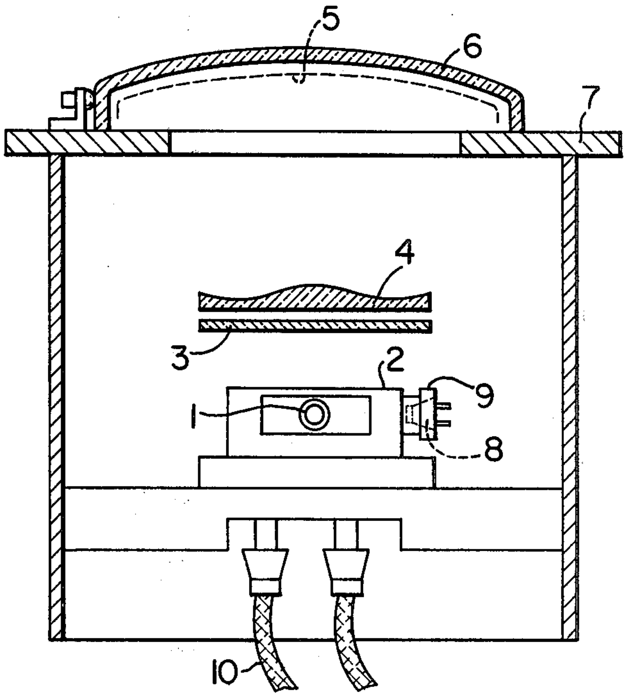
FIG. 1 is a sectional view showing the principal parts of an embodiment of an exposure apparatus according to the invention.

As shown in FIG. 1, the exposure apparatus according to the illustrated embodiment comprises a lamp housing 2 including a light source 1 consisting of a very high pressure mercury lamp, a luminance correcting filter 3 for correcting the distribution of the luminance on the phosphor screen, a correction lens 4 for aligning the locus of the beam of light emitted from the light source 1 with the actual path of the electron beam, a plate 7 for holding in place a panel 6 having the inside surface thereof coated with a slurry of phosphor material (not shown) and also having a shadow mask 5 disposed inside, a light receiving system 9 fitted in the lamp housing 2 and including a light receiver 8, cooling water pipes 10, etc.

Figure 2:
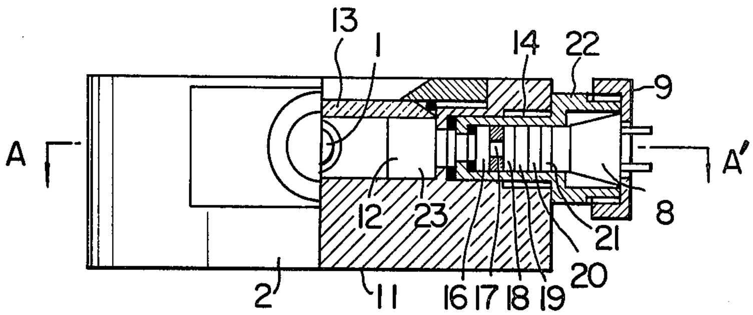
FIG. 2 is an enlarged detailed view of the lamp housing and light receiving section in the exposure apparatus shown in FIG. 1.
Figure 3:
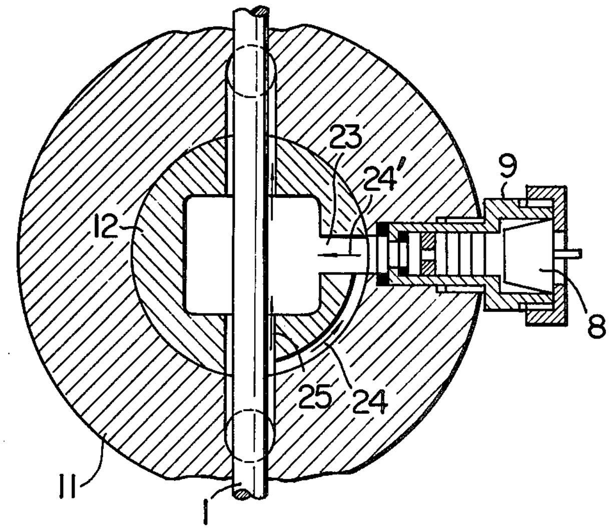
FIG. 3 is a sectional view taken along the line A—A' of FIG. 2.

FIGS. 2 and 3 are enlarged views of the structure in which the light receiving system 9 is fitted in the lamp housing 2 of FIG. 1. As is shown in the Figures, the lamp housing 2 includes the mercury lamp light source 1, a housing body portion 11 for holding the mercury lamp in place and also serving as a cooling water container, an arc length base plate 12 for determining the length of the light source, a transparent upper quartz plate 13 for transmitting light and also making the cooling water container watertight, etc., and it further includes an opening 14 into which the light receiving system 9 is fitted.

On the other hand, as shown in FIGS. 2 and 3, the light receiving system 9 comprises, in addition to the light receiver 8, a quartz plate 16 for water seal, a pinhole plate 17 for reducing the light from the light source, a glass plate 18 for obstructing the transmission of ultraviolet rays having wavelengths of about 3,000 Å or less, a glass diffusion plate 19 for diffusing the light transmitted through the pinhole, a heat radiation absorbing filter 20 for absorbing the heat radiation from the light source, a spectral filter 21 for transmitting only those specific wavelengths ranging from 3,500 to 4,000 Å, a light receiver holder 22 for holding these elements, etc. The light receiving system 9 is fitted in the opening 14.

During the time that the above-mentioned exposure apparatus is operated, the running water introduced through the cooling water pipe 10 of the lamp housing cools the mercury lamp 1 as well as the entire lamp housing 2. Consequently, the light receiving system 9 is also cooled. Further, the light receiver 8 of the light receiving system 9 is not heated greatly by the heat radiation, since it is subjected only to the light transmitted through the pinhole plate 17. Thus, the temperature of the light receiver 8 does not rise and consequently the brightness of the light source 1 can be controlled with improved accuracy. Also, since the incident light on the light receiver 8 is one which was passed through the pinhole plate 17, the filter 18 for absorbing the undesired ultraviolet rays and the spectral filter 21, there is no possibility of the light receiver 8 being exposed to the undesired ultraviolet rays with the result that the light receiver 8 is not practically deteriorated under the effect of ultraviolet rays and thus it has a long-time service durability.

Further, in accordance with the invention, to prevent the bubbles in the cooling water from staying in the space between the light receiver 8 and the light source 1, i.e., a space 23 shown in FIG. 3 and affecting the light input to the light receiver 8, bubble inhibiting water channels 24 and 24' are provided in addition to a mercury lamp cooling water channel 25 thus ensuring improved results.

What is claimed is:

1. A phosphor screen exposure apparatus for color picture tubes containing a lamp housing, a light receiving system fitted in said lamp housing, an exposure object panel, a luminance correcting filter for correcting distribution of luminance on said panel, and a correction lens for aligning locus of a light emitted from said lamp housing with the actual path of an electron beam, said lamp housing comprising:

a light source exposing a slurry coated on an inner surface of said exposure object panel through a shadow mask disposed near said inner surface of said panel;

a housing body portion holding said light source in place, said housing body portion including a space serving as a cooling water container, a first cooling water channel passing through said space and enclosing said light source therein for cooling said light source, a second cooling water channel connected between a portion of said first cooling water channel and said space, cooling water being adapted to flow in said first channel through said space and said second channel to cool said light source and said lamp housing;

a transparent upper plate transmitting light emanating from said light source toward said panel and making the cooling water container watertight; and an opening provided to receive light emitted from said light source, said light receiving system being fitted in said opening;

said light receiving system comprising:

a light receiver receiving the light emanating from said light source and generating, in response thereto, a control signal which controls the brightness of said light source;

a light receiver holder holding said light receiver in a predetermined position in said light receiving system, said light receiver holder being disposed in said opening of said lamp housing;

a transparent water sealing plate for sealing water and transmitting part of said light toward said light receiver;

a pinhole plate provided between said transparent water sealing plate and said light receiver for passing a part of the light entering said sealing plate; and a spectral filter, disposed between said pinhole plate and said light receiver, for selecting and transmitting light having a predetermined wavelength range;

said light receiver being disposed in a recess in said light receiver holder, said light receiving system being adapted to be cooled via heat transmission from said light receiving system to said lamp housing, said second cooling water channel serving to prevent retention of bubbles in front of said transparent water sealing plate, and said cooling water between said transparent water sealing plate and said light serving to absorb heat ray components in the light emitted from said light source and entering said sealing plate.

2. A phosphor screen exposure apparatus as defined in claim 1, wherein said light receiving system further comprises a glass plate removing ultraviolet rays, a glass diffusion plate diffusing light, and a heat ray absorbing filter absorbing the heat radiation from said light source, disposed between said pinhole plate and said spectral filter.

3. A phosphor screen exposure apparatus as defined in claim 1, wherein said spectral filter selects and transmits light having wavelengths of 3,500–4,000 Å.

4. In an exposure apparatus containing a lamp housing, a light receiving system fitted in said lamp housing, and an exposure object, said lamp housing comprising:

a light source for emitting a controlled quantity of light to be received by said exposure object;

a housing body portion holding said light source in place, said housing body portion including a space serving as a cooling water container, a first cooling water channel passing through said space and enclosing said light source therein for cooling said light source, a second cooling water channel connected between a portion of said first cooling water channel and said space, cooling water being adapted to flow in said first channel through said space and said second channel to cool said light source and said lamp housing;

a transparent upper plate transmitting light emanating from said light source toward said exposure object and making the cooling water container watertight; and an opening provided to receive light emitted from said light source, said light receiving system being fitted in said opening;

said light receiving system comprising:

a light receiver receiving the light emanating from said light source and generating, in response thereto, a control signal which controls the brightness of said light source;

a light receiver holder holding said light receiver in a predetermined position in said light receiving system, said light receiver holder being disposed in said opening of said lamp housing;

a transparent water sealing plate for sealing water and transmitting part of said light toward said light receiver;

a pinhole plate provided between said transparent water sealing plate and said light receiver, for passing a part of the light entering said sealing plate; and a spectral filter disposed between said pinhole plate and said light receiver, for selecting and transmitting light having a predetermined wavelength range;

said light receiver being disposed in a recess in said light receiver holder, said light receiving system being adapted to be cooled via heat transmission from said light receiving system to said lamp housing, said second cooling water channel serving to prevent retention of bubbles in front of said transparent water sealing plate, and said cooling water between said transparent water sealing plate and said light source serving to absorb heat ray components in the light emitted from said light source and entering said sealing plate.

5. A phosphor screen exposure apparatus as defined in claim 4, wherein said spectral filter selects and transmits light having wavelengths of 3,500–4,000 Å.

* * * * *